Aug. 14, 1928.
W. F. J. CASEY ET AL
1,681,095
TRUCK CONSTRUCTION
Filed April 30, 1927 2 Sheets-Sheet 1
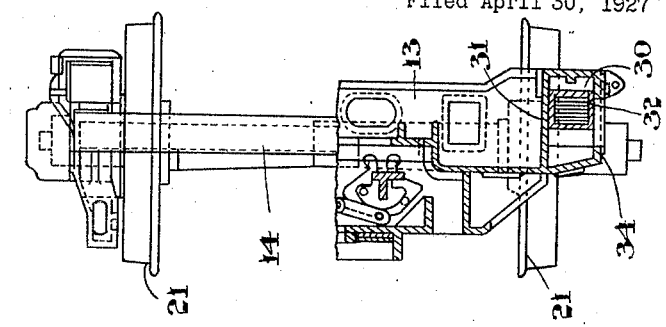
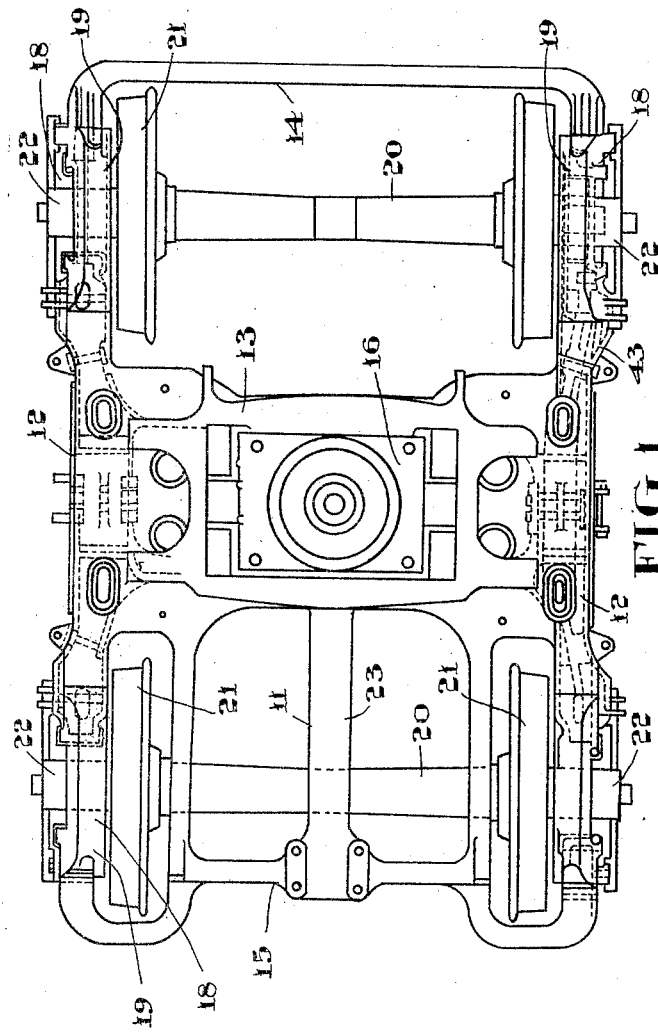
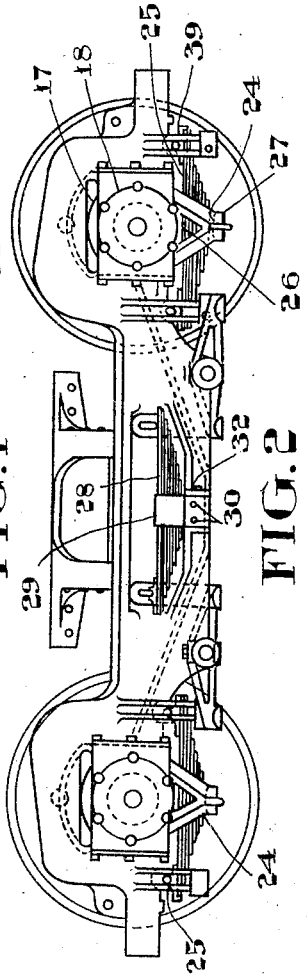
INVENTORS
WILLIAM. F. J. CASEY
GUSTAVE CAVIN
CHARLES. E. BROOKS
BY Fetherstonhaugh & Co
ATTORNEYS

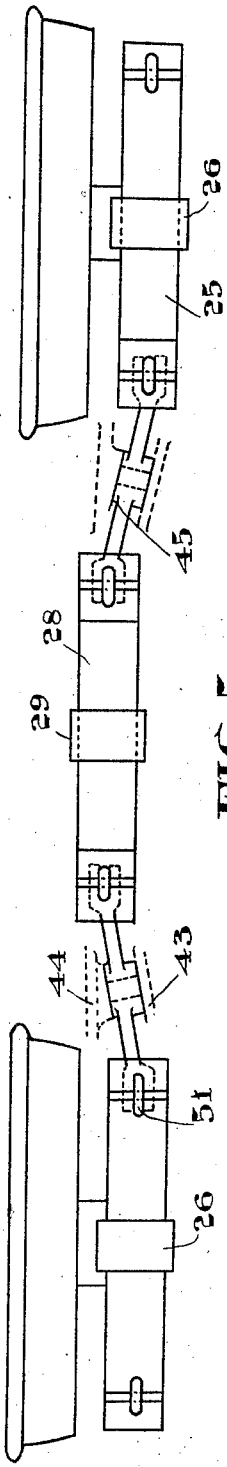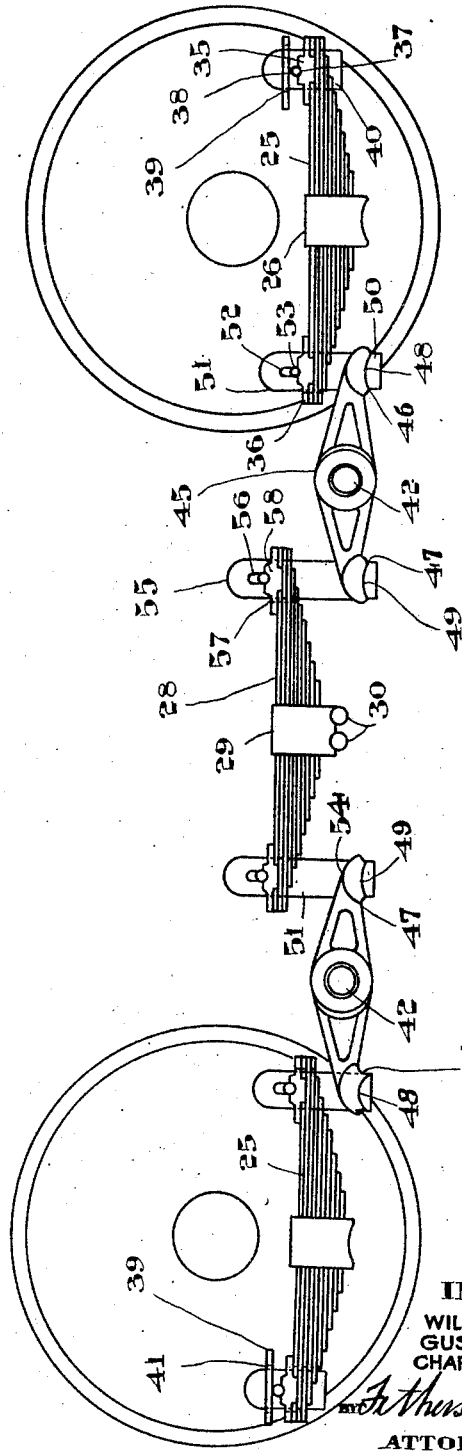

Patented Aug. 14, 1928.

1,681,095

UNITED STATES PATENT OFFICE.

WILLIAM F. J. CASEY AND GUSTAVE CAVIN, OF KINGSTON, ONTARIO, AND CHARLES E. BROOKS, OF MONTREAL, QUEBEC, CANADA.

TRUCK CONSTRUCTION.

Application filed April 30, 1927. Serial No. 187,853.

This invention relates to new and useful improvements in truck construction and, particularly, to the construction of the leading trucks for locomotives and the suspension means therefor.

The object of the invention is to provide a leading truck of simple construction which will be very easily dismantled for repairs, and in which the journal boxes will be positioned on the outside of the travelling wheels to facilitate inspection, oiling and repairing of the journal box parts.

Another object is to provide a leading truck in which the riding springs will be arranged to absorb and evenly distribute between the journal boxes, any shocks due to rail joints and the like, thereby reducing the possible chance of spring breakages to a minimum.

A further object is to provide a leading truck in which the suspension springs will be protected by the truck framing.

According to our invention, the leading truck frame is built in one piece with jaws or guides formed therein to receive the journal boxes. The journal boxes are mounted to move in the vertical direction within the guides, and are positioned on the outside of the travelling wheels. Integral cross tying members are formed in the truck at the ends thereof to form guards for the travelling wheels. The truck is provided with a series of suspension springs and equalizers, so arranged that they evenly distribute between the journal bearings any shocks which may occur during the travelling of the device. The sides of the truck frame are shaped to receive and partially cover the spring suspension means to protect same.

In the drawings which illustrate one form of our invention:—

Figure 1 is a plan view of our improved type of leading truck for locomotives.

Figure 2 is a side elevation of the truck shown in Figure 1.

Figure 3 is an end elevation of the truck shown partly in section.

Figure 4 is an enlarged detail showing the spring suspension means and the equalizer.

Figure 5 is a plan view of the device shown in Figure 4.

Referring more particularly to the drawings, 11 designates the truck frame which comprises the side sections 12, the central connecting section 13, and the end tying sections 14 and 15. The above-mentioned sections are preferably made as a single casting, so that the loading may be distributed by the supports or suspension means hereinafter referred to. Mounted on the central section is the centre casting 16. Formed in the side sections near the ends thereof are the guides 17 and slidably mounted therein are the journal boxes 18, which are provided with flanges 19 which embrace the sides of the guides. The boxes are mounted to move vertically in the guides. Secured to the axles 20 are the travelling wheels 21, which are positioned between the bearings and between the side sections, with the journals 22 rotatably mounted in the journal bearings. The end sections connect the side sections and form guards for the travelling wheels. A suitable tying member 23 may be formed in the truck frame between the end section 15 and the centre section 13. The spring supporting members 24 are preferably made integral with the journal bearings and depend from the underside thereof. The springs 25, which are of the semi-elliptic type, are provided with a centre saddle 26 which rests on the cross bar 27 of the member 24. Each side section is provided with a central spring 28 of the semi-elliptic or laminated plate type, with a centre saddle 29 preferably grooved on its underside to rest on and engage with the pins 30 passing through the ribs 32 and the vertical webs 31 of the side frames, which are of channel-shaped cross section at the centre, as shown in Figure 3, with the vertically disposed ribs 32 and 34. Bearing plates 35 and 36 are secured to the ends of the springs 25. Grooves 37 are formed in the plates 35 to receive pins or rollers 38, which bear against hardened steel plates 39 secured to the underside of the side sections of the frame in proximity to the ends thereof. Suspended on the pins 38 and embracing the ends of the springs are the guides 40. The guides pass through suitable slots 41 cut in the plates 39. Pivotally supported on pins 42 positioned midway between the springs and passing through spaced vertical webs 43 and 44 of the side sections are the equalizer beams 45, the outer ends 46 and 47 of which are provided with bearings 48 and 49, respectively. The bearings 48 rest on saddles 50, suspended on the links 51, which are provided with suitable bearing pins 52, which rest in the grooves 53 formed in the bearing plates 36. The links pass through slots formed in the ends 46 and in the ends of the springs 25 adjacent thereto. The ends 47 rest on saddles or bearings 54 formed in the lower ends of the links 55 suspended from the ends of the springs 28 by means of the bearing pivot pins 56. The pins 56 rest on grooved end bearing plates 58 fitting into recesses 57 formed in the ends of the springs 28. The springs 25 are positioned directly below the journals and the springs 28 are partially enclosed by the side sections, so that the springs are protected to a certain extent. The equalizer beams are also protected by being positioned between the vertically disposed webs of the side members, or sections of the frame. The ends of the equalizer beams are bifurcated and the ends of the springs adjacent thereto are slotted to allow the suspension links to pass therethrough, and also, to form a means for holding the links in place.

Modifications may be made in the construction of the truck frames and the manner of mounting the suspension links, without departing from the spirit of the invention.

In operation the load of the front end of the locomotive is transferred to the truck frame, through the centre bearing, and the truck frame being of integral construction, transmits the load evenly to the journal boxes through the springs and equalizer beams. The points of application of the load is through the pins supporting the equalizer beams and the bearing plates in proximity to the ends of the frames. The outside springs, or the springs beneath the journal boxes, take up the main part of the load, while the centre springs act as a balancing means to evenly distribute between the bearings any shocks or jolts which may take place during the operation of the bogie. This arrangement of spring suspension is very flexible and tends to reduce spring breakages to a minimum.

It will be seen that the springs are partially covered and protected by the truck frame. The bearings are placed on the outside of the travelling wheels, so that easy access is obtained to the journal box bearings for inspection, oiling and repairs. The frame being made in one casting, tends to reduce the initial cost of the frame and also the maintenance of same under working conditions. The frame is properly braced to prevent breakages therein and the end bracing members, or sections, guard the wheels. The device is very easily assembled.

Having thus described our invention, what we claim is:—

1. In a locomotive truck, a truck frame, journal bearings slidably mounted in the frame, axles rotatably mounted in the bearings, travelling wheels attached to the axles between the bearings, springs beneath the bearings, one end of each of the springs engaging with the frame, equalizer beams pivotally secured to the frame, each being attached at one end to the free end of the bearing spring, shock absorbing springs mounted on the frame between adjacent ends of the equalizer beams, and means connecting the adjacent ends of the beams to the ends of the equalizer springs.

2. In truck construction, a frame, journal bearings slidably mounted in the frame, semi-elliptic springs positioned beneath each bearing and engaging at one end with the frame and at the centre with the bearing, equalizer beams pivotally mounted in the frame, means connecting the free ends of the springs with the equalizer beams, semi-elliptic equalizer springs between the adjacent ends of the equalizer beams and resting on the frame, and means pivotally connecting the adjacent ends of the equalizer beams and the equalizer springs.

3. In truck construction, a frame, journal bearings slidably mounted in the frame, semi-elliptic springs engaging with and positioned below the bearings and having one end of each engaging with the frame, equalizer beams pivotally secured to the frame, and having one end of each pivotally suspended on links depending from the bearing springs, equalizer springs supported in the centre of the frame, and having depending links engaging with adjacent ends of the equalizer beams.

4. In truck construction, a frame, journal bearings slidably mounted in the frame, said bearings having supports depending therefrom, semi-elliptic springs resting on said supports and having one end engaging with the frame, equalizer beams pivotally secured to the frame and each pivotally secured at one end to the end of the bearing spring adjacent thereto, equalizer semi-elliptic laminated springs supported at the centre of the frame and having their ends pivotally connected to the ends of the equalizer beam adjacent thereto.

5. In truck construction, a frame, journal boxes slidably mounted in the frame, supports depending from the underside of the bearings, semi-elliptic springs for each bearing and having their saddles resting on the supports, one end of each of said springs being provided with a grooved plate adapted to receive a roller which engages with a plate secured to the frame, equalizer beams pivotally secured to the frame, one end of each of the equalizer beams being pivotally attached to the free end of the bearing spring adjacent thereto, equalizer springs of the semi-elliptic type having their saddles resting on pins passing through the centre of the frames, links pivotally securing the centre springs to the ends of the equalizer beam adjacent thereto and means to position the springs under the bearings.

6. In truck construction a one-piece frame, journal bearings slidably mounted on the frame and having supports depending therefrom, semi-elliptic springs resting on said supports and having one end of each spring engaging with the truck frame, equalizer beams pivotally mounted in the frame, one end of each of the beams being pivotally secured to the end of the bearing spring adjacent thereto, equalizer springs resting on pins passing through the frame and having their ends pivotally secured to the ends of the equalizer beams attached thereto, said frame being channel-shaped at the centre to partially enclose the equalizer springs.

7. In truck construction, a one-piece frame comprising side sections, a centre section and end tying sections, journal box bearings slidably mounted in guides formed near the ends of the side sections, axles rotatably mounted in the journal bearings and having travelling wheels secured thereto between the bearings, semi-elliptic springs mounted in supports depending from the bearings, said springs each having one end engaging with the underside of the frame, equalizer beams pivotally secured to the frame and having one end of each of the beams pivotally secured to the free end of the bearing springs, equalizer semi-elliptic springs resting on pins passing through the side sections, and means pivotally connecting the ends of the equalizer springs to the ends of the equalizer beams adjacent thereto, said side sections being of channel form at the centre to partially enclose the equalizer springs and said end tying sections of the frame acting as guards for the travelling wheels.

In witness whereof, we have hereunto set our hands.

WILLIAM F. J. CASEY.
GUSTAVE CAVIN.
CHARLES E. BROOKS.